June 21, 1949.  P. H. TRICKEY  2,474,195
DUAL-VOLTAGE DUAL-SPEED CAPACITOR MOTOR
Filed Feb. 14, 1946  2 Sheets-Sheet 1

Inventor
Philip H. Trickey
By William P. Stewart
Attorney

Witness:
N. Leszczak

June 21, 1949.    P. H. TRICKEY    2,474,195
DUAL-VOLTAGE DUAL-SPEED CAPACITOR MOTOR
Filed Feb. 14, 1946    2 Sheets-Sheet 2

Inventor
Philip H. Trickey
By William P. Stewart
Attorney

Witness:
N. Leszczak

Patented June 21, 1949

2,474,195

UNITED STATES PATENT OFFICE 2,474,195

DUAL-VOLTAGE DUAL-SPEED CAPACITOR MOTOR

Philip H. Trickey, North Plainfield, N. J., assignor to The Singer Manufacturing Company, Elizabeth, N. J., a corporation of New Jersey Application February 14, 1946, Serial No. 647,450

7 Claims. (Cl. 318—225)

This invention relates to electric motors and more particularly to those motors which are supplied from a single-phase source of energy, have main and auxiliary stator windings displaced from each other in space phase, and employ phase-shifting means, preferably capacitors, for establishing a time phase displacement between the currents in said stator windings.

It is known in the art of electric motors to employ a parallel connection of main winding stator coils for normal voltage operation and to reconnect these coils in series for double voltage operation at the same voltage. It is also known, in the case of double line voltage, to connect the auxiliary capacitor phase circuit in parallel with one-half of the series-connected main winding coils in order that the same voltage may be applied to said capacitor circuit as when the line voltage is normal. This is important in keeping the size and cost of the capacitor to reasonable values.

It is desirable to provide a single motor having windings which may be reconnected to form four different motor ratings, viz. (1) normal voltage, high speed, (2) normal voltage, low speed, (3) double voltage, high speed, and (4) double voltage, low speed. In this manner, the dealer need stock only these motors, from which he may, by the simple act of reconnection, supply his customers with motors having any one of four ratings.

It is also desirable that the switching circuits for dual-speed operation at both normal and double voltage be simple and require only standard, inexpensive switches and ordinary connections. This finds application in heater fan service, for example, where it is important to have selectively available a low and a high air-flow rate.

It is an object of this invention, therefore, to provide a capacitor motor capable of being readily reconnected to meet any one of four separate ratings.

A further object of this invention is to provide a simple, inexpensive switching circuit for a capacitor motor whereby said motor may be selectively operated at either one of two speeds at a single voltage.

With the above and other objects in view, as will hereinafter appear, the invention comprises the devices, combinations and arrangements of parts hereinafter set forth and illustrated in the accompanying drawings of a preferred embodiment of the invention, from which the several features thereof and the advantages attained thereby will be readily understood by those skilled in the art.

In the accompanying drawings.

Figure 1:
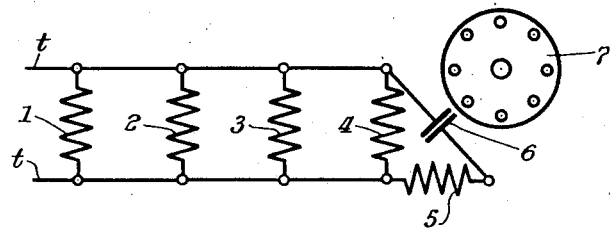
Fig. 1 is a diagrammatic illustration of a motor connected for normal voltage, high speed operation and embodying the invention.

Referring now to Fig. 1, the motor comprises four stator main winding elements or coils 1, 2, 3, and 4, a stator auxiliary winding coil 5, a capacitor 6 and a closed-circuited squirrel-cage induction rotor 7. The electrical input terminals are denoted by $t$—$t$ and are connected for operation to a source of single-phase alternating current energy, not shown. As shown in Fig. 1, the main winding is divided into four identical elements or coils, each of which has the same number of effective turns and is connected in parallel across the terminals $t$—$t$. It is to be understood that these coils need not necessarily coincide with the pole winding but may comprise turns from more than one pole and include turns from part of a pole. These coils or winding elements would, for example, each comprise a single pole winding in the case of a four-pole motor. A two-pole motor would have two coils per pole winding and a six-pole motor would have ⅔ of a coil per pole winding. Auxiliary winding 5 is connected in series with capacitor 6, said series circuit being connected in parallel with the paralleled main winding coils. The parallel connection of Fig. 1 is used for normal voltage operation at high speed. The full line voltage is applied across each main winding coil and the value of the volts per turn is a maximum. It is understood that auxiliary winding 5 may have any number of effective turns relative to the effective turns of the main winding, comprising coils 1, 2, 3 and 4.

Figure 2:
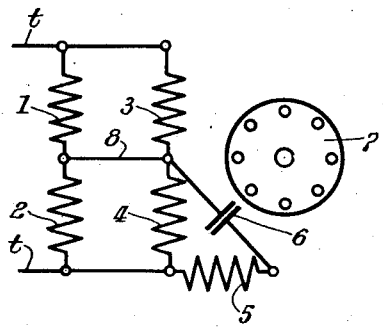
Fig. 2 shows the motor of Fig. 1 reconnected for operation either at normal voltage, low speed, or at double voltage, high speed.

The combined series-parallel connection of Fig. 2 is for the same speed but for double the voltage employed with the parallel circuit of Fig. 1. Under this condition, the value of the volts per turn is the same as in Fig. 1. The Fig. 2 connection may also be employed for operation at normal voltage, the same as in Fig. 1, in which case the volts per turn value is reduced to one-half and the speed accordingly lowered.

The circuits of Fig. 1 and Fig. 2, by themselves, represent well known practice. When, however, it is attempted to reconnect the motor windings from the series-parallel circuit of Fig. 2 to the full series circuit of Fig. 4, in order to obtain low-speed operation at double voltage, the switching problem becomes complicated and requires the use of a three-pole switch which is undesirable. To overcome this difficulty, I have devised the novel circuit arrangement of Fig. 3 to be used in substitution for the circuit of Fig. 2, and in which I may employ for dual-speed switching an ordinary double-pole, double-throw switch which can be economically procured and built in a small convenient size. It will be seen that, by comparison with Fig. 3, the line 8 of Fig. 2, connecting the common junctions of coils 1 and 2 and coils 3 and 4 respectively, has been omitted. This enables the reconnection to the circuit of Fig. 4 to be made with an ordinary two-pole double-throw switch 9 in the simple circuit shown in Fig. 5. Although circulating currents may flow in the circuit of Fig. 3, I have not found any serious adverse effect on the motor operation. Further, the advantages derived from the simpler, smaller and less expensive switching arrangement provided by the circuit of Fig. 3 are of great practical importance.

Figure 3:
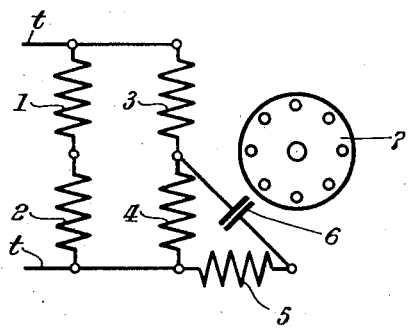
Fig. 3 shows the motor of Fig. 1 reconnected for the same type of operation as provided by the connection of Fig. 2.

It will be seen from Fig. 3 that, for dual-voltage operation, the voltage applied to the capacitor phase circuit remains substantially normal due to the voltage divider or auto-transformer effect of the main winding coils 3 and 4. When normal voltage is applied to the circuit of Fig. 3, the volts per turn value of the main winding is reduced and the speed accordingly lowered as compared with that of Fig. 1.

Figure 4:
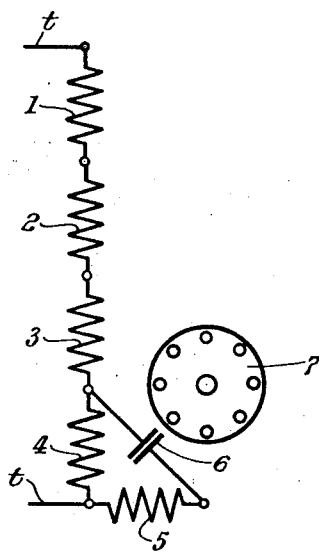
Fig. 4 shows the motor of Fig. 1 reconnected for operation at double voltage, low speed.

The circuit of Fig. 4 is specifically for double voltage operation at low speed and comprises series-connected main coils 1, 2, 3 and 4 connected to the line and an auxiliary or capacitor phase circuit connected in parallel with one of said main coils. The volts per turn value of the main winding has been reduced from that of Fig. 3 and the speed thereby decreased. The voltage impressed on the auxiliary phase circuit will be approximately one-quarter of its normal value.

Thus the circuits of Figs. 1 through 4 represent the same motor reconnected for four different ratings, all without greater-than-normal voltage applied to the capacitor phase circuit.

Figure 5:
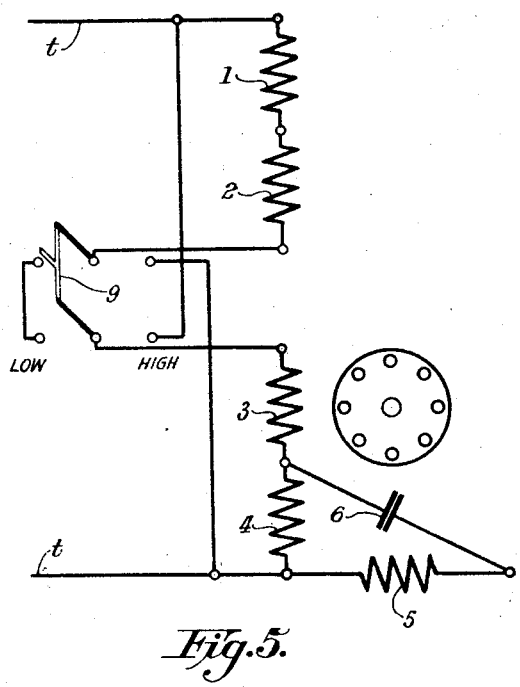
Fig. 5 shows the motor of Fig. 1 connected for dual-speed operation at double voltage.

Fig. 5 shows a simple circuit employing a double-pole, double-throw switch 9 for switching between the connections of Fig. 3 and Fig. 4 and needs no further explanation.

Figure 6:
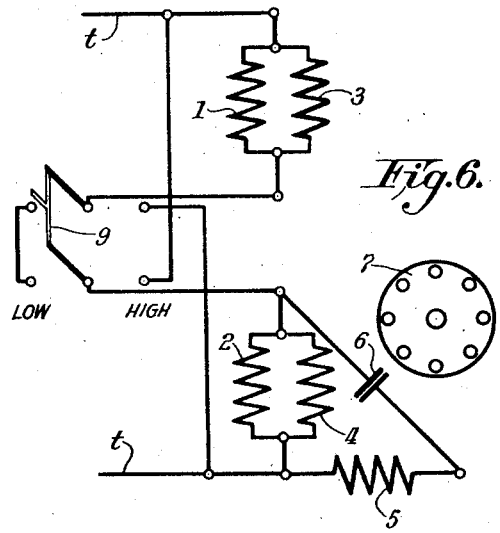
Fig. 6 shows the motor of Fig. 1 connected for dual-speed operation at normal voltage.

The circuit of Fig. 6 is for selective dual-speed operation on normal voltage using an ordinary double-pole, double-throw switch 9. This circuit provides for switching between the circuits of Fig. 1 and Fig. 2 and requires no further explanation.

Figure 7:
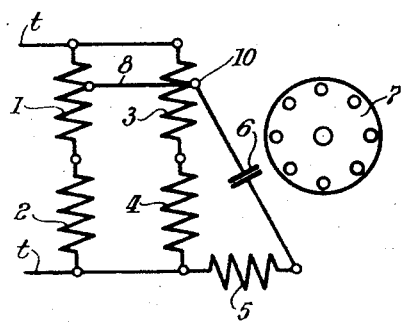
Fig. 7 shows a modification of the connection of Fig. 2.
Figure 8:
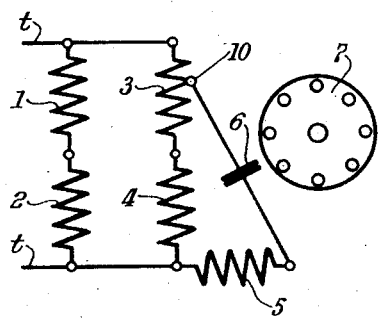
Fig. 8 shows a modification of the connection of Fig. 3.
Figure 9:
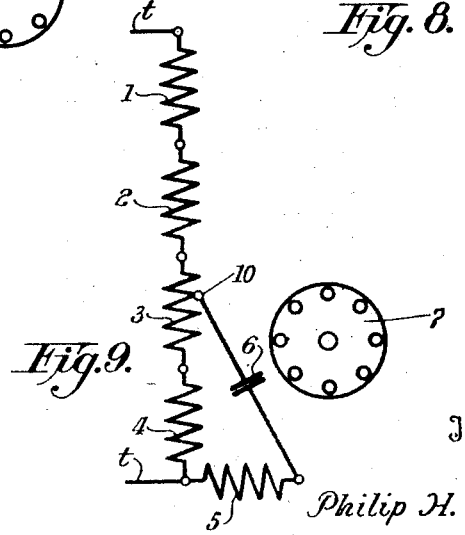
Fig. 9 shows a modification of the connection of Fig. 4.

As above described, connections to the capacitor phase circuit have been made only at convenient points between coils. However, this invention is not to be construed as so limited but includes within its scope arrangements in which a lead to the capacitor phase circuit is tapped into any point on a main winding coil. This may be slightly more inconvenient or expensive than connecting to the coil terminals but may prove distinctly advantageous for applying the proper voltage to the capacitor phase, from the point of view of obtaining the proper efficiency or speed. Accordingly, the circuits of Figs. 7, 8 and 9 are modifications of the circuits of Figs. 2, 3 and 4, respectively, and have a lead to the capacitor phase circuit connected to tap 10 on the main winding coil 3. It will be understood that, under certain conditions, tap 10 may provide better operation if made on coil 4.

It will be seen from the various circuits here presented that the auxiliary winding circuit, including the capacitor, is connected permanently across the same portion of the main winding regardless of which of the four different rating connections is used. This provides simple switching and decreases the number of leads required to be brought out of the motor case.

From the foregoing it will be perceived that I have provided a simple, inexpensive switching arrangement by means of which a single motor may be reconnected to have four separate ratings, and selective dual-speed operation may be secured for either normal or double line voltages by manipulating a simple double-pole, double-throw switch.

It is to be understood that various other changes may be made in the construction, arrangement and inter-relation of the parts constituting the invention without departing from the spirit thereof; and the same is not limited to the form shown. Reference will therefore be had to the appended claims for a definition of the limits of the invention.

Having thus set forth the nature of the invention, what I claim herein is:

1. A capacitor motor comprising two line terminals, a closed-circuited rotor, a stator having a main winding and an auxiliary winding disposed thereon at a space angle to each other, said main winding comprising four coils, each having substantially the same number of effective turns, a capacitor connected in series circuit relation with said auxiliary winding, said main winding coils being connected in series across the line terminals, and said series auxiliary circuit, including the capacitor, being permanently connected across only one of said main winding coils.

2. A single-phase motor comprising line terminals, a close-circuited rotor, a stator having a main winding and an auxiliary winding disposed thereon at a space angle to each other, said main winding comprising series-connected pairs of coils, each coil having substantially the same number of effective turns, phase-shifting means connected in series circuit relation with said auxiliary winding, and series-connected pairs of coils being connected in parallel across the line terminals, and said series auxiliary circuit being permanently connected in parallel with only one of said main winding coils.

3. A single-phase motor comprising line terminals, a closed-circuited rotor, a stator having a main winding and an auxiliary winding disposed thereon at a space angle with each other, said main winding comprising series-connected pairs of coils, each coil having substantially the same number of effective turns, phase-shifting means connected in series circuit relation with said auxiliary winding, said series-connected pairs of coils being connected in parallel across the line terminals, and said series auxiliary circuit being permanently connected across a portion of only one of said series-connected pairs of coils.

4. A dual-speed capacitor motor comprising a closed-circuited rotor, a stator having thereon a main winding and an auxiliary winding disposed at a space angle to each other, said main winding comprising series-connected pairs of coils, each coil having substantially the same number of effective turns, capacitor means connected in series circuit relation to said auxiliary winding, said series circuit being permanently connected in parallel with one of said main winding coils, means for, at times, connecting said series-connected pairs of coils in parallel across a source of single-phase alternating current energy for relatively high-speed motor operation, and means for, at other times, connecting said series-connected pairs of coils in series across said source for relatively low-speed motor operation.

5. A dual-speed capacitor motor comprising a closed-circuited rotor, a stator having thereon a main winding and an auxiliary winding disposed at a space angle to each other, said main winding comprising series-connected pairs of coils, each coil having substantially the same number of turns, capacitor means connected in series circuit relation to said auxiliary winding, said series circuit being permanently connected in parallel with a portion of one of said series-connected pairs of the main winding, means for, at times, connecting said series-connected pairs of coils in parallel across a source of single-phase alternating-current energy for relatively high-speed motor operation, and means for, at other times, connecting said series-connected pairs of coils in series across said source for relatively low-speed motor operation.

6. A dual-speed capacitor motor comprising a closed-circuited rotor, a stator having thereon a main winding and an auxiliary winding disposed at a space angle to each other, said main winding comprising series-connected pairs of coils, each coil having substantially the same number of effective turns, capacitor means connected in series circuit relation to said auxiliary winding, said series circuit being permanently connected in parallel with a portion of one of said main winding coils, means for, at times, connecting said series-connected pairs of coils in parallel across a source of single-phase alternating-current energy for relatively high-speed motor operation, and means for, at other times, connecting said series-connected pairs of coils in series across said source for relatively low-speed motor operation.

7. A dual-speed capacitor motor comprising a closed-circuited rotor, a stator having thereon a main winding and an auxiliary winding disposed at a space angle to each other, said main winding comprising series-connected pairs of coils, each coil having substantially the same number of effective turns, capacitor means connected permanently in series circuit relation to said auxiliary winding, said series circuit being permanently connected in parallel with one of said main winding coils, double-pole, double-throw switch means for, in one position, connecting said series-connected pairs of coils in parallel across a source of single-phase alternating-current energy for relatively high-speed motor operation, and, in the other position, connecting said series-connected pairs of coils in series across said source for relatively low-speed motor operation.

PHILIP H. TRICKEY.

REFERENCES CITED

The following references are of record in the file of this patent:

UNITED STATES PATENTS

| Number | Name | Date |
|---|---|---|
| 1,725,558 | Ballman | Aug. 30, 1929 |
| 1,912,207 | Kennedy | May 30, 1933 |
| 1,912,337 | Kennedy | May 30, 1933 |
| 1,934,060 | Hanning | Nov. 7, 1933 |
| 1,979,160 | Kennedy | Oct. 30, 1934 |